Figure 6:
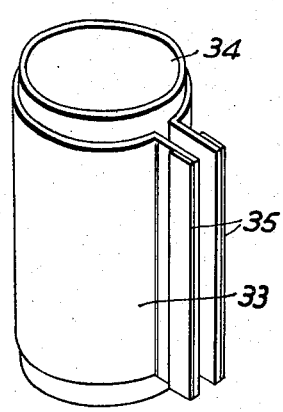

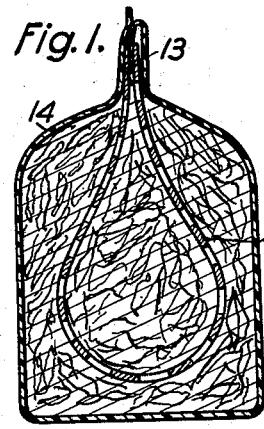
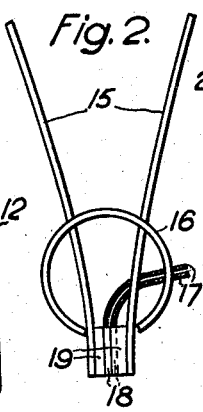
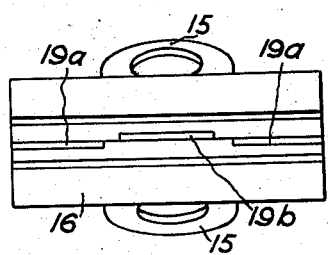
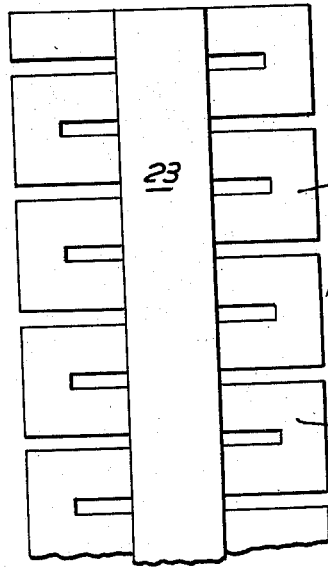
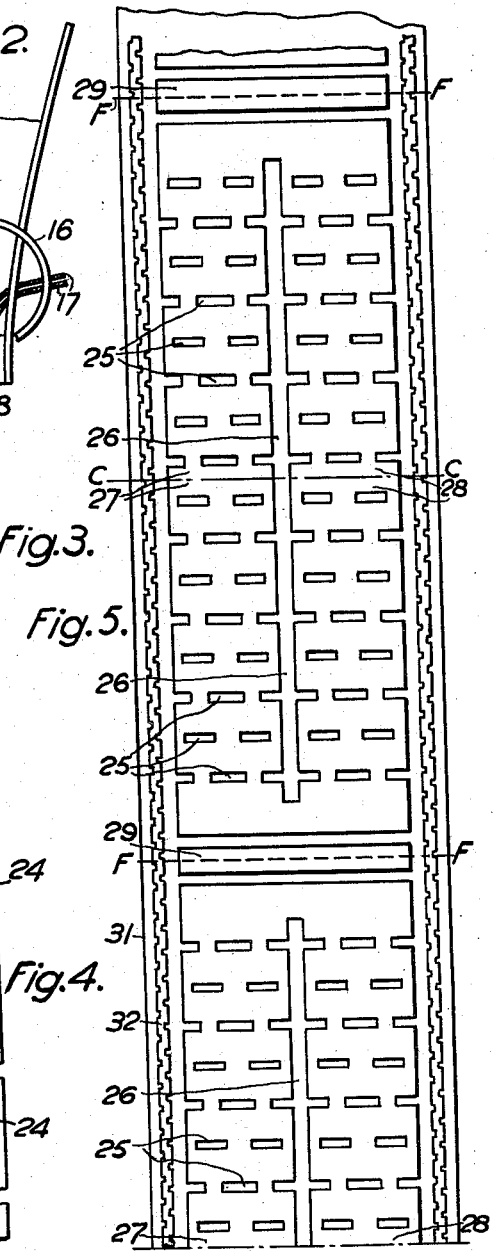

Aug. 13, 1963  P. EISLER  3,100,711
FOOD PACKAGE
Filed July 18, 1958  5 Sheets-Sheet 2

PAUL EISLER
by  _____
Attorney

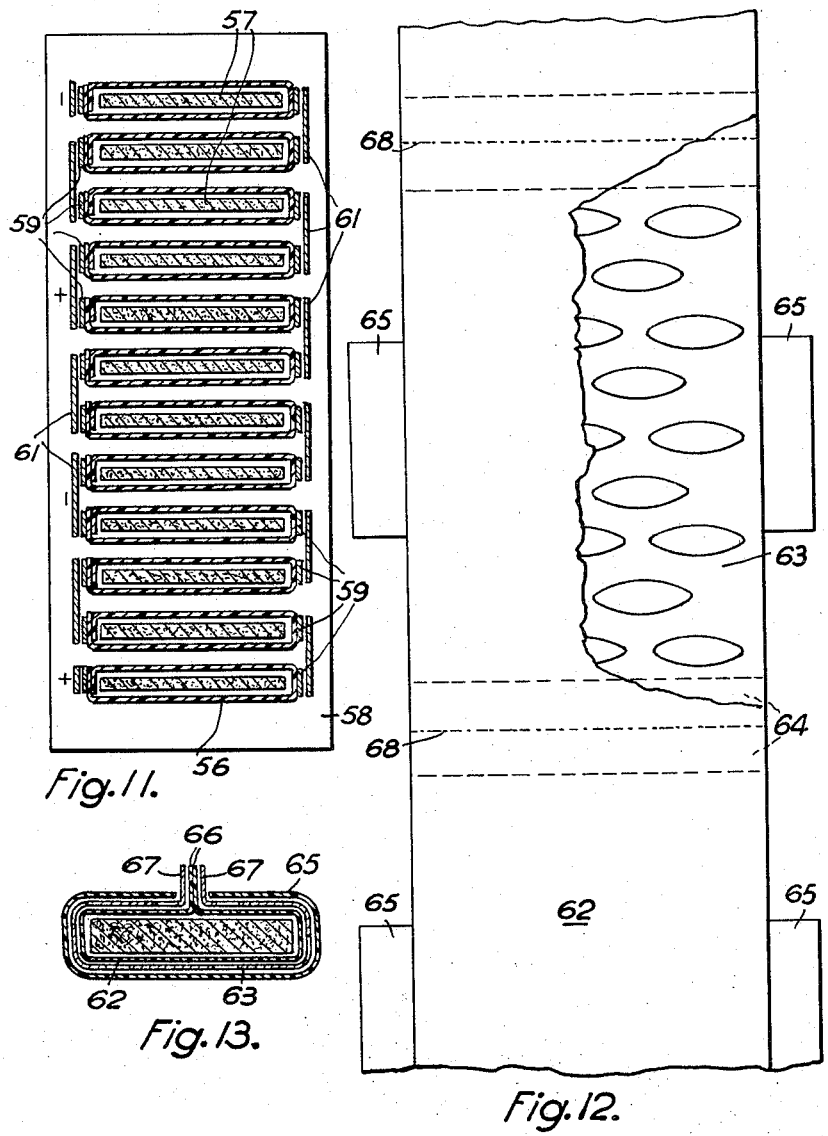

Aug. 13, 1963 P. EISLER 3,100,711
FOOD PACKAGE
Filed July 18, 1958 5 Sheets-Sheet 4
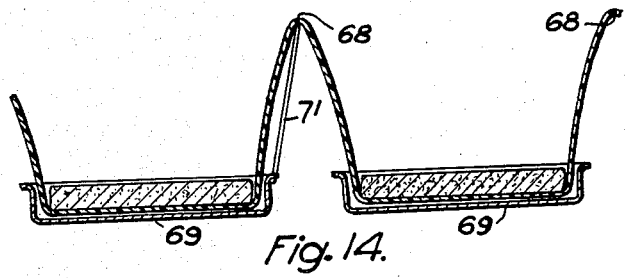
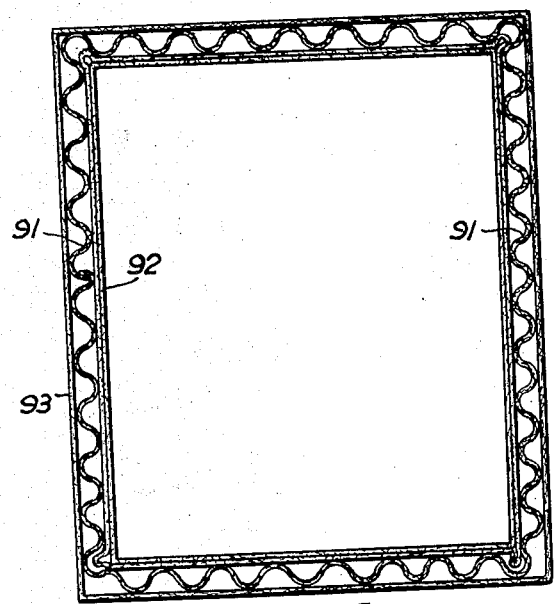
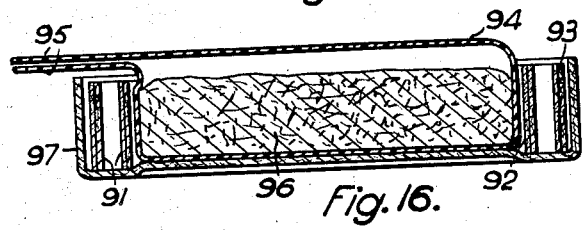
PAUL EISLER
by
Attorney Aug. 13, 1963 P. EISLER 3,100,711
FOOD PACKAGE
Filed July 18, 1958 5 Sheets-Sheet 5

PAUL EISLER
by
Attorney

United States Patent Office 3,100,711
Patented Aug. 13, 1963

3,100,711
FOOD PACKAGE
Paul Eisler, 57 Exeter Road, London NW. 2, England
Filed July 18, 1958, Ser. No. 749,554
Claims priority, application Great Britain July 24, 1957
14 Claims. (Cl. 99—171)

The supply of hot food in catering establishments such as restaurants and canteens, schools, hotels, camps and hospitals, through vending machines, to the motorist or passenger in train, ship, plane or coach, and last but not least to parties and individuals in private homes depends so much on personal service and/or costly equipment that it is found ever more unsatisfactory.

The object of the present invention is to simplify the heating of food and it does this by means of a dispensible heating film forming an electrical resistance of large surface area and very small thickness, which is associated with a food package or an eating appliance and includes terminal areas for attachment to a low voltage supply and which when so connected is capable of supplying heat to the food at a predetermined rate.

The heating film in many cases will form part or the whole of a food package though other possibilities are envisaged and will be described. In any case the resistance may consist of a metallic pattern, preferably of metallic foil forming a flimsy structure. Preferred structures will be described later in more detail, but briefly they can be visualized as flimsy fabrics consisting of a metallic foil pattern on a thin plastic film.

The low voltage on which the films are designed to operate may advantageously be the same as that of the usual motor car battery, namely 12 volts. For use on aircraft they may be designed to operate at 24 to 28 volts as supplies at this voltage are usually available. Provision is however made in some cases to operate them for a very short time (to give a high heat shock) at about 48 volts, but always remaining below the voltage level which it would be dangerous to touch and below the voltage which is subject to the insulation and earthing regulations of various electricity authorities.

The heating films as proposed by the present invention are dispensible for hygienic reasons and convenience. They have therefore to be produced very cheaply and this is made possible by the present invention apart from the use of a very simple method of production of the film because they are designed to be only flimsy structures without need of and provision for good class electrical insulation, without a heavy heat conductive mass for achieving even surface temperature and without substantial or particular mechanical protection against the ultimate user's handling of the food. They are cheaply produceable also because they are only required to work reliably not more than once and because they usually form part of the food package or eating appliance so that at most only a fraction of their total cost is an additional cost.

There are film materials under development, and in some cases already in limited production, which can be used as heating films without a patterning process. Such film materials are for instance ultra thin titanium foil, lacquered steel foil, or plastic films on which a metallic layer has been deposited by vacuum evaporation or which are otherwise coated with an electrically conducting layer, or which contain a high carbon or graphite filler. When their production will have been improved and will have reduced their cost sufficiently, they can be used for the present invention.

At the present time, however—and this relates to cost, availability and quality—a plastic film carrying a metal foil pattern is preferred. It is also a preferred means of carrying out the invention on account of the versatility and choice of materials, forms and decorative treatments it offers, and the variety of different technical requirements it can satisfy. The manufacture of the foil pattern on the plastic film, the provision of additional layers and the satisfaction of the various technical requirements described later can follow some of the now well-known lines of packaging practice and permits the use of the cheapest metal foil (thin aluminium foil) on practically any type of plastic film which would in all probability be chosen for the particular packs in any case so that the cost is substantially not much greater than that of normal packaging.

The heating films of the invention are designed to work reliably only once with the foodstuff or eating appliance with which they are associated. A design for repeated use would defeat a good deal of the hygienic purpose of the invention apart from the cost involved.

Designing for a single occasion of use is carried out by a combination of steps which within the paramount limits of cost and economy aim at (A) Keeping the film as intact as possible until this occasion arises
(B) Making the film of wide applicability notwithstanding the great variety of requirements of various foodstuffs and their treatment prior to this occasion while saving any provisions which would be required if the film were to be used again.

The flimsiness of the heating film is primarily motivated by reasons of cost and heat capacity but it presents the problem of satisfying the above aims, (A) in full and (B) at least in part. To this end (a) the current path of the metal foil pattern irrespective whether it is itself in series or parallel with other paths, is subdivided into several parallel small and interlinked paths as long as their widths do not become too small, remaining say larger than 0.01 inch thus avoiding difficulties due to pin holes.

The co-pending U.S. Patent applications Serial No. 783,633, filed November 10, 1958, now Patent No. 3,020,- 378, and Serial No. 789,221, filed December 29, 1958, describe the method of expanding foil into such multipath meander line patterns which are the preferred way of carrying out the above step.

(b) The metal foil is crimped. In said U.S. applications it has been shown how this crimping assists production of the film but in the present context another aspect of crimping is used. The crimped metal foil pattern is not only much more elastic than the smooth pattern and therefore better capable of surviving indents or other local stresses, it to some extent also compensates the hot spot effect due to a hole which interrupts only one or a few of the small parallel interlinked paths of a whole pathway.

The mechanism of this action is the following: Crimping means that a major part of the foil surface is at a slope to the overall surface of the film and that the total area of this overall surface is smaller than the total actual foil area would be if all crimps were stretched out. If a hole is made in a part of a meander limb which reduces its width the intact limb on this width is stressed by nearly the same force originating largely from the crimps due to inherent stresses as was exercised on the width of the whole limb. It consequently flattens out to some extent. As the main heat transfer is in the direction normal to the overall surface of the film, the flattened part can dissipate heat better and remains therefore a somewhat cooler hot spot than would have been the case with an equivalent smooth foil pattern.

(c) The invention protects the heating film against any corrosive influences of the foodstuff and—in compliance with health regulations—prevents any danger of food being poisoned by the heating film, if necessary by providing a thin layer between food and foil (such as a plastic film, or a coating on the foil) but as the film is not to be reused it does not have to be provided with mechanical protection from damage caused by emptying the food from the package or using the eating appliance, by scraping or tearing it with cutlery, or even by removing it from the hot food. This is strictly in accordance with point (B) above.

In the heating film the prime function of the foil supporting layer is the same as in the normal food package, that is to serve as a barrier-layer, a container, a decoration carrier etc. To put the metal foil pattern on it is not a necessity, but in the main a measure to make it as effective and to keep it as intact as possible without much extra cost until it is used. Using a normal food packaging material as a support for the foil pattern permits a thinner and therefore more resistive foil pattern than would otherwise be practicable and thus permits a safe and economical voltage (12 volts up to 48 volts to be used). Its insulating function at such a voltage is very secondary.

The practical production method of some of the major types of heating film are described in said co-pending U.S. patent applications while the present invention also includes novel structures and means which will be described later.

The invention will be further described with reference to the accompanying drawings which illustrate a number of possible embodiments and modes of uses of the heating film without being in any way exhaustive.

Figure 7:
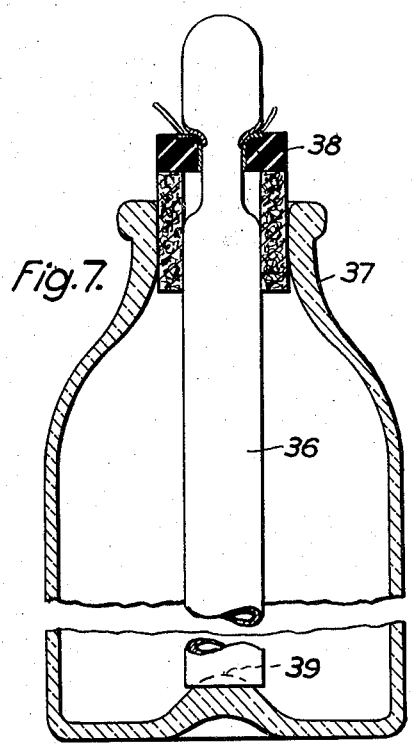
Figure 8:
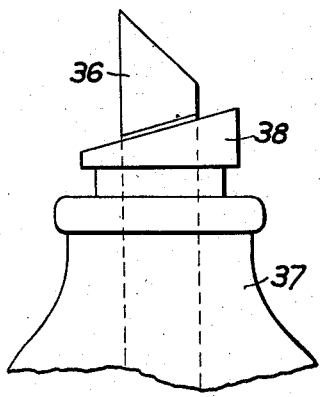
Figure 9:
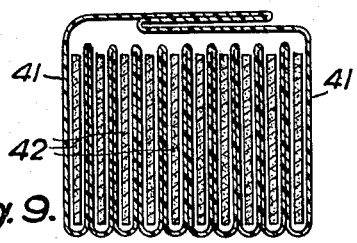
Figure 10:
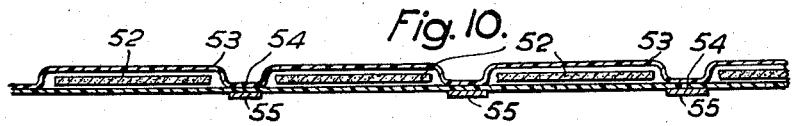
Figure 17:
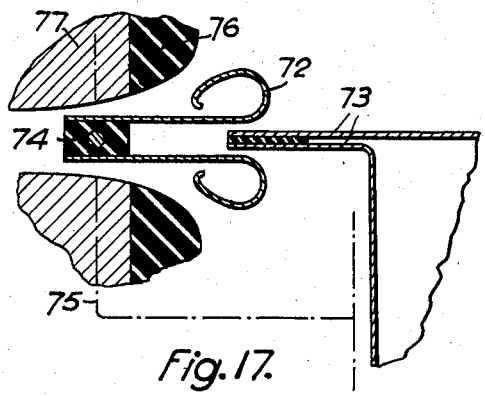
Figure 18:
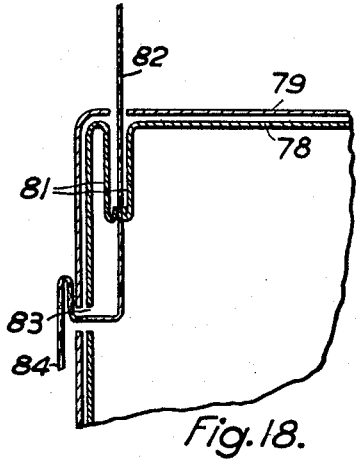
Figure 19:
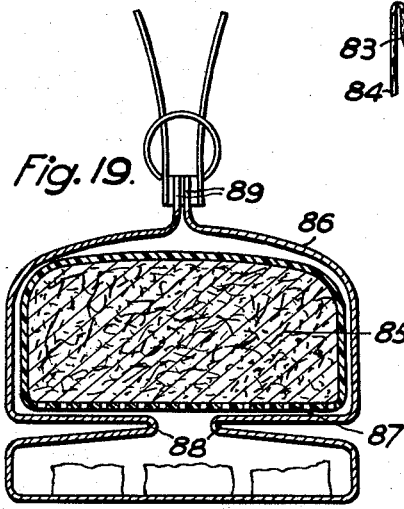

FIGURE 1 illustrates a particularly simple form of the invention,

FIGURE 2 shows in end view a convenient form of connector for making rapid connection to the terminals of a heating film according to the invention, FIGURE 3 shows in a view at right angles to FIGURE 2 a development of the connector, FIGURE 4 shows an example of a heating film intended to be looped and sealed into a bag, FIGURE 5 shows one form of heating film which can be folded up to form a bag, FIGURE 6 shows the application of the heating film of the invention to a canister, FIGURES 7 and 8 are views at right angles to one another of a device according to the invention for heating the contents of a bottle during pouring out, FIGURE 9 shows a mode of using the heating film so as to attain very rapid heating of foodstuffs in the form of slices, FIGURE 10 shows an alternative to FIGURE 9, FIGURE 11 shows yet another alternative to FIGURE 9, FIGURE 12 is a plan view showing a form of film used in wrapping slabs of deep frozen foodstuff, FIGURE 13 is a sectional end view showing one of the wrapped packages using the film of FIGURE 12, FIGURE 14 is a diagram showing the process of forming the package of FIGURE 13, FIGURE 15 is a plan view of part of another form of deep frozen package, FIGURE 16 is a part sectional view of the complete package of FIGURE 15, FIGURE 17 is a section of a combined connecting device and switch, FIGURE 18 is a sectional detail of one arrangement of terminals in a package embodying the heating film, and FIGURE 19 is a sectional view of a pack intended for steaming the foodstuff.

The simplest form of all of the heating film is no more than a piece of aluminium foil, preferably patterned to increase its electrical resistance and suspended within a mass of granular foodstuff such as potato crisps in a conventional paper or other electrical insulating bag together with just enough insulation to keep the terminal areas apart. A diagrammatic section is shown in FIGURE 1. The foodstuff has a loop of the foil 12 within it with a slip 13 of insulating foil between the ends and the whole is contained in a paper or like bag 14. The slip 13 may be adhesively secured and as shown it may conveniently be part of the bag folded over. Preferably also the bag is constructed so that the top must be torn away to gain access to the terminal areas and to provide an air-vent during heating.

Connection of the foil to the supply may be made by the connector shown in FIGURE 2 which comprises a simple spring clip device consisting of two pivoted arms 15 terminating in jaws pressed together in this example by the aid of a bow spring 16. The leads 17 bringing the supply are connected to foil contacts 18 backed by rubber or like insulation 19 mounted on the jaws and which engage the terminal areas of the heating film such as the foil 12 of FIGURE 1. To avoid short-circuiting the supply when the clip is released without a heating film in place but with the supply still connected with the lead 17, the foils 18 extend over less than half the length of the jaws and are not opposite one another, but the backing 19 extends over the full length so that the jaws squarely press against the terminal areas on the film or one another.

If, as shown in FIGURE 3, one jaw carries two foil contacts 19a with separate leads to each contact and the other a single contact 19b, this device can also be used for connecting to a heating film with two electrical paths and bringing these paths into series or parallel by external switching. For the same purpose there can also be another terminal arrangement with two foil contacts on both the opposite jaws of the connector and four leads if the insertion or removal of the food package operates the switching directly.

If the foil in FIGURE 1 needs patterning to give the necessary resistance, the necessary coherence can be obtained by using expanded foil as described in said co-pending U.S. patent applications. Alternatively a flat meander patterning can be used which, as shown in FIGURE 4, can be given the necessary coherence by replacing the insulating slip 13 of FIGURE 1 by an adhesive insulating tape 23 extending right across the foil 24 before the latter is looped, in order to hold the limbs of the pattern spaced correctly along a central strip. The tape can obviously be made of whatever width may be necessary to give the pattern the necessary coherence.

Another very simple material for use for instance for bags or wrappings is a two-layer packing material consisting of a laminate of patterned aluminium foil and plastic film. The choice of plastic film depends—apart from the usual packing considerations (compatibility with contents, vapour-permeability, price, strength, facility for decoration, etc.)—on the temperature endurance of the particular plastic. When the intended heating temperature is low enough it permits the use of ordinary polythene film, polyvinylchloride, regenerated cellulose (cellophane) and even paper. Where higher temperature plastic films are needed, irradiated or high density polyethylene, polycarbonate, or polyester film is chosen while others may become available in the course of time.

If, for instance, a bag is made from this two-layer material, the aluminium foil is first patterned by any known process, such as expanding as in said U.S. patent applications or punching slots. The pattern provides one (or more) continuous aluminium line(s) with very small gaps between them and covers nearly the whole area of the bag except for certain strips which are not connected with the continuous heater line(s). As shown by way of example in FIGURE 5 the continuous lines are produced by rows of apertures 25 and long slots 26. Consideration will show that this results in a number of meandering paths in parallel being produced between a terminal area 27 and a terminal area 28 of each portion of the patterned area. Between each such patterned area and not connected with the continuous heater lines are transverse strips 29 which form edge reinforcements on the fold when the material is folded into a bag. It will be understood that a repeating pattern is produced of a continuous length of insulating support 31 which is severed at the dot lines and folded at the dot and dash lines, FIG. 5. Another strip 32 also not connected with the continuous lines is arranged along each edge. This is a narrow line with many holes or notches to increase its resistance. When the material is folded into a bag, the longitudinal edges are folded over and these fine line patterns 32 are connected to a suitable voltage supply to provide the necessary sealing heat. The overlaid plastic film edges weld together in the areas of the gaps between, within, and around the metal lines 32. The hot metal lines themselves also become adherent to the plastic. This procedure is, of course, only possible where the heat-sealing temperature lies well above the designed maximum operating temperature of the bag and where the seal is not affected by operating temperature.

With the particular arrangement shown, when the bag is completed there are two separate patterns, one on each side, each having two terminal areas. A device similar to that shown in FIGURE 2 may be used but with each of the two rubber packings 19 each carrying two contact foils extending over a little less than half length. The foil contacts opposite one on the two rubber backings will be of the same polarity so that when the device is closed without a bag in position, there is no short-circuiting.

The pattern of the continuous heater line or lines is usually a meander with very small gaps, wide and short arms covering nearly the whole area available as shown in FIGURE 4. It can however be so shaped as to form an ornament, sign or lettering, or take part in the decorative treatment of the package. The anodizing and colouring facilities available for aluminium can be utilized to enhance this effect, and decorative printing can be combined with printing of acid resists for etching for the same purpose. The ink only needs to be cleaned off the terminals.

It is also possible to imprint the aluminium foil on the side bonded to the plastic film prior to the laminating or coating process. The term coating refers for example to the plastic film being made by lacquering the aluminium foil. The gaps in the pattern can be hidden to some extent for instance by overprinting the gaps with an ink of the colour of the reverse side of the foil.

The aluminium foil pattern can be on the inside or on the outside of the package. To reduce damage in transport it is advisable to provide a protective coating by varnishing or bonding of a plastic, usually transparent, film over it. In this case the heating film has become by association or incorporation a three layer material, not counting the layer or layers of ink for foil patterning or decoration.

In the structure plastic film-foil pattern-plastic film, there can be substituted for the outward plastic film practically any insulating material suitable for the package, and of the desired thermal insulation and mechanical properties. Thus plastic foam, papier mache, corrugated paper, cellular cardboard crate material, etc. can be used as the outside layer. Alternatively and based on conventional packaging considerations such material or a metal foil or other metal wall may be stuck to the plastic film while the foil pattern remains without a protective plastic film.

A structure of a three layer material: unpatterned aluminium foil-plastic film-aluminium foil pattern is very suitable for foil packs and forms a preferred material for flexible packaging. In view of the good heat conduction of the unpatterned aluminium foil which is desirably about .002 inch thick, the foil pattern can leave more gaps of the area and thus be used more easily for decorative effects or lettering. This material can—according to the invention—also provide other effects described later.

A three layer structure of the final package can also be made by fixing a two-layer material round a canister (metal wall of canister-plastic film-foil pattern) or inside or outside another food container. For such fixing purposes it is proposed prior to or after patterning, to apply an adhesive layer, such as self-adhesive coating, to the plastic film or to the aluminium foil of the two- or three-layer material. The adhesive must be chosen to withstand not only the operating temperature safely, but also to suit the surfaces it has to stick to.

By its application to a three-layer material a four-layer material including heating the film proper is obtained to which again further layers can be added during processing or fixing to the container or appliance wall. The flexible part of this heating film however, consisting of adhesive and plastic film or films, metal foil or foils, ink and sometimes paper or cardboard or similar fabrics, remains an extremely cheap dispensible material. It permits a choice of placing a metallic, plastic, adhesive or cellular surface on the inside or outside of the food container or appliance, permits most conventional decorative treatments and adds some further facilities for decoration. It is safe to touch when connected to the low voltage supply. The thinness of the heating film renders it less important to its heating efficiency whether the source of heat, which is the foil pattern, is nearer the inside or the outside of the film. Thus the choice of the material to be in contact with the food and/or the container or appliance wall is not restricted.

Where hot food is likely to attack the plastic film thermally or chemically, the heating film of the invention consisting of continuous aluminium foil-adhesive and paper-foil pattern, used with the aluminium foil inside, that is in contact with the hot food, offers particular advantages and the paper fibres will keep apart the two metal layers even when the plastic or other adhesive which bonds the layer of the film softens. For heating to still higher temperature thin asbestos paper instead of ordinary paper may be used as separating layer, as glass fibres, polytetrafluoroethylene or other very high temperature enduring plastics are still too expensive for a dispensible heating film.

An adhesive based on waterglass and put on in droplets rather than in a continuous film is suitable for sticking the foils to the paper. It is preferable to coat this heating film with a varnish, and it is not necessary to use an expensive heat-resistant varnish. It may soften or crack at the operating temperature without damage to the operating function of the heating film. The production of this high temperature heating film is best effected by separately producing on the one hand the foil pattern on the varnish film and on the other hand the aluminium foil laminated to asbestos paper with the sodium silicate adhesive. Both materials are then bonded together, with the same or a similar adhesive, the foil pattern face being placed against the asbestos paper.

The foregoing description has so far illustrated the basic structures and the production of heating films able to achieve any desired temperature permitted by the particular materials incorporated—say up to about 600° F.—during the short operating time of the heating film. This covers the range of temperatures required for defreezing food and for keeping food warm and heating it up for immediate consumption or in boiling, steaming, baking, stewing, frying and other cooking operations. Before describing further varieties of the structure of the dispensible heating film which are all the subject of the present invention, several applications of the heating film which are themselves also subjects of the present invention will be described by way of example.

The description of these applications will also help to illustrate some of the further structural features of some species of the heating film according to the invention which will be described in conjunction with an example of their application.

One of the simplest uses of the heating film will be in heating up cold precooked food ranging from soups to pies and puddings, from sausages to stews, from vegetables and fruits to drinks of many kinds. In the case of packages of some frozen food it may be only necessary to heat them up to quickly defreeze the food which is eaten cold while with other frozen food packs and in case of most other wrapped or tinned or bottled foods it is desired to heat them up quickly to be eaten or drunk hot.

The following examples will illustrate the application of the heating film as or in some of the above food packages:

(a) In FIGURE 6 the heating film is a disc or wide tape 33 stuck or otherwise fixed to the outside of a canister 34. It is supplied with the canister or separately. The terminals, one being shown at 35, are on end flaps which can be folded against the wall of the canister. For separate application the film may be supplied with a self-adhesive backing in long length or as labels in a roll or in a flat dispenser.

(b) The heating film is an "immersion" heating tape or tube put inside a container of liquid or semi-liquid food or it is a bag containing the food placed inside a rigid tin, jar or other container. In this category also falls the provision of a heating film as a strainer at the mouth of a liquid food container or of a tubular collapsible or folded-up heating film immersed in a bottle or dispensing device. The heating film is switched on only when it is fully stretched out or unfolded and liquid is to be poured out. Both varieties of film can be associated with measuring and dispensing devices for the liquid and can actually constitute such devices either inside the bottle or container or be fixed outside to the cork or screw stopper. They heat more or less only the liquid poured out and do this ideally while the liquid is being dispensed (and measured). By way of example as shown in FIGURES 7 and 8 a film formed into a tube 36 passes through the stopper of a bottle 37 and its upper end is cut off at a slope to form a pouring spout. Just where it comes through the stopper its sides are pinched in and the terminal areas are provided here to be engaged by a forked wedge form connector 38 on which connecting foils are provided to make contact with the terminal areas and lift the tube 36 a little so that its lower end rises above a boss 39 on the bottom of the bottle which previously closed it and allows the bottle contents to be poured out becoming heated as they flow along the tube. An additional closure and sealed cover can be provided at the upper end of the tube to exclude dust and the like before use and to ensure that the bottle has not been tampered with.

(c) In FIGURE 9 the film is a long web 41 folded concertina-wise, the folds holding thin slices 42 for the foodstuff. The whole may be enclosed in the usual wrapping or container. This arrangement permits very quick heating up in view of the large surface area in contact with the food and the thinness of the food sandwiched between the folds of the heating film. There may be a slice in each fold, but for easier removal of the hot food, as shown only the odd folds of the web are filled with food slices, the even folds being compressed together; thus the web assumes a comb-like configuration. The comb ends may as shown be bent to enclose the slices completely. The heating film may be porous or perforated to permit circulation of liquid or vapour between adjacent slices or the slices may have inner wrappings for easier and cleaner removal. More than one web may be arranged in a food package or container. This application of the heating film is one preferred way for quick de-freezing of deep-frozen food, for rendering wafers and biscuits crisp again and for many solid foods which are enclosed in a package of insufficient surface areas to permit a speedy enough penetration of heat from that area to the inside.

It is not necessary to always heat up all slices while they are in their box or container. The heating film can have terminals (not shown) at the folds to permit the heating up of a single slice or of a group of slices, and the heating can be arranged either while the slices are in the box or outside with the heating webs partly unfolded.

(d) Instead of inserting slices into the folds of one or more long heating webs the slices 52 can as shown in FIGURE 10 be wrapped individually in heating films 53 provided with tear off zones 54 between the slices. For enclosure in a box the whole length may be folded zigzag at the zones 54 or rolled up. All the heating films in one box are patterned so that the complete pattern is coherent and the parts belonging to each slide are connected in parallel, but each part has accessible terminals indicated at 55. In this way provision is made to permit heating of slices singly or in a group after tearing off the film containing the single slice or group, or when for instance all groups are in series all together, inside or outside the box. Perforations in the heating film will permit the easy escape of vapour (for crisping) or of steam. The proposed method of heating will also permit the marketing of new types of food in thin slices, such as sausages, minced meats, tarts etc.

(e) An alternative to the tear-off heating film is a completely separate heating film 56 for each slice 57 as in FIGURE 11. In this case the inside of the box 58 can have metal foil strips which connect all heating films as long as they are in the box. The simplest arrangement is to provide terminals 59 at the ends of each film and two supply strips in the box so that all are in parallel but it is preferred to connect heaters of a number of individual slices in series. They form a group and all groups in a box are paralleled. Thus as shown there may be short strips 61 in the box each connecting two adjacent terminals 59 and if these strips are energised as indicated by the signs + and − the desired scheme is obtained.

(f) A particularly useful application of the invention is to the defreezing and reheating of precooked deep frozen food whether in establishments such as restaurants and canteens, in aircraft or other vehicles or again in places of entertainment, in the home or in camps. Certain equipment is saved and in the case of aircraft and other vehicles there is a valuable saving not only of the cost of such heating equipment, but even more important of its weight and the space occupied by it.

It is proposed to fill food while hot from cooking into containers which are considerably shallower than are customarily used at present in large scale catering, so that when deep frozen the food is in shallow slab form and to equip the slabs with the heating film preferably over both large surfaces but at least over the lower large surface. The film may be present in the containers or it may be wrapped around the partly or fully frozen slab. The first part of the freezing is desirably effected very quickly by a coolant of such low temperature that at least a deep frozen wall is formed along the walls of the container (which is provided with a separating film or release agent) so that the food can then be removed. The container can be returned for reuse while the freezing is continued at the usual temperature of the cold store. Wrapping and sealing of the heating film is then effected or completed and the slab is then ready for delivery to the place of use. It will be observed that the containers never leave the factory and are in any case rapidly returned to use. Thus, the number of containers required is reduced and the problems of cleaning and sterlizing are much simplified.

If the food is to be served in the usual way on plates, the film is preferably of flexible type so that after defreezing and heating the food can be squeezed out of the film as out of a collapsible tube. If the slab is a single portion, the package can be supported on the plate during heating while if it is a multiple portion it can be supported on a shallow tray or inclined board.

Markings enabling single portions to be dispensed at a time from a multiple pack may be incorporated in the design of the metallic pattern of the heating film. Single portion slabs may be formed in a continuous package with seals between the slabs much after the fashion of the arrangement above described with reference to FIGURE 10, but with the slabs taking the place of slices. Also it is possible for the multiple package to contain slabs in rows across as well as along it. These arrangements dispense with the need for measuring devices in serving the heated food.

Desirably weighty terminal clips or a synthetic rubber pad with terminals or some other means of exerting light pressure on the top of the food pack during re-heating are provided so that good contact between the heating film and the food is assured. Soon the boundary layer of the food will liquify and ensure an even and good heat transfer from the heating film to the frozen food further inside. As soon as it is certain that the liquid medium is present over the whole area of the heating film, the rate of heating can be increased to as much as will keep this liquid medium near the boiling point or just below the temperature limit of the polythene film, whichever is the lower. As a precaution the foil pattern must be designed so that the resistance of those meander paths which are at the top of the food package is higher than the resistance of those at the bottom which is the present case are assumed to be parallel to the paths on top and which are more certain of good contact with the food before and after it has liquified. Consequently the top part of the heating film will not get so hot nor have such a high heat dissipation as the bottom part.

In some cases it may only be convenient to provide the heating film at the bottom of the package, for instance by laying the films in the containers into which the hot food is filled. This limits the rate at which the food can be defrozen and heated. Where the demand can be estimated accurately, time can be allowed for this, but to increase the rate where there is a sudden demand an additional heating film bent into a form which is like that shown in FIGURE 9 but with folds of less depth can be inserted into the foodstuff from above as soon as the heating from below has softened it sufficiently, the insertion being preferably effected by the aid of a bar member made of wood with cross blades which fit into the folds of the film, the bar member being withdrawn as soon as the film has been pressed into position. This further film has a much larger area in contact with the food than that at the bottom and it is well distributed through the bulk of the food so that it enables the rate of heating to be speeded up very considerably. Its terminal areas may be arranged simply to overlie those of the one at the bottom so that the two are connected in parallel across the same connections to the supply.

In a simple arrangement in which the food is filled into direct contact with the film, the film may be of very thin flexible and cheap wide web consisting of aluminum foil patterned between two polythene films of a quality able to endure a "high" temperature as that term is understood in connection with polythene. The pattern in principle comprises bus bars and meander lines desirably of the expanded foil type as in said U.S. Patent applications and the polythene foils are arranged to leave the terminal constituted by the bus bars bare and the size being such that the film can completely enclose the slab and leave the terminal areas of the two flaps standing up from the surface of the slab so that connection can be made by means of a device such as shown in FIGURE 2 or 3.

For a single file of packages the web is preferably made up as shown in FIGURE 12 of a base layer as wide as the extent in this width direction of an individual or multiple portion as may be desired, consisting of a continuous layer 62 of high temperature resisting polythene film bearing a repeat pattern of aluminium foil 63 preferably of the expanded foil type as disclosed in said U.S. patent applications and incorporating bus bars 64 across the length of the layer 62. On the other side of the foil pattern 63 separate cross pieces 65 of the same polythene film extending beyond the longitudinal edges of the layer 62 equally on both sides are secured. Using for convenience the term length for dimensions in the longitudinal direction of the layer 62, the width of the layer is equal to the width of the slabs and the length of each cross piece 65 is equal to twice the sum of the length and thickness of the slab so that the cross piece can just encircle the slab. In the width direction each cross piece extends beyond the edges of the layer 62 by slightly more than the thickness of the slab so that these projecting parts can completely cover the end of a slab. The distance between the adjacent edges of successive crosss pieces 65 is occupied by a bus bar 64 just wide enough to provide two terminal areas. Thus, from centre to centre of two successive bus bars, the heating film has the form of a cross with wide but short arms and if this is folded about a slab with the cross piece outermost, the slab can be completely unwrapped leaving across the centre of the width two flaps 66 with terminal areas 67 of the foil pattern, the two areas being insulated from one another by the polythene tape 62 as shown in FIGURE 13. During packing and transport, these flaps 66 can be folded down flat and then be raised for connection to be made when heating is to be effected.

To facilitate separation of the successive packs the layer 62 and metallic pattern 63 can have a row of perforations 68 along the mid-line of each bus bar area. As shown in FIGURE 14 the containers into which the food is filled are preferably shallow metal trays 69 each with a wide blade 71 temporarily fixed to its side. The film is laid in the trays and the relative dimensions are such that the lines of perforations 68 come into register with the top edges of the blades 71 which shear through the tape when the tray is lifted off a conveyor on which it is carried past a filling station and into a freezing tunnel. The surface of the tray is made very smooth to permit quick chilling by conduction when the tray is taken through a metal channel held at very low temperature whereby the above mentioned frozen wall is produced.

It it is desired to deal with several files of packages side by side on the same conveyor a multiple layer can be used comprising a series of parallel layers 62 each with a metal pattern 63 as before while the cross pieces 65 will extend over the whole series. The distance between adjacent layers 62 will be a litle more than twice the thickness of the slabs. The cross pieces may then be perforated half way between adjacent layers to allow easy separation of the individual packages which each crosspiece holds together like a chain.

If the food is to be served on trays as is convenient particularly on vehicles such as trains, and in aircraft and also in camps and places of entertainment, or again in the home when television is being used, it is desirable that the food should be contained in a container having sufficient stiffness as supporting while the food is being defrozen and reheated. Such container may be arranged to fit into a recess in a tray, or the containers may be constituted by the trays, though separate dispensible containers are preferred. In the latter case, the heating film can be embedded in the food and easily be removed when the food is hot either by the consumer or the person who serves him. If, as is preferred, a separate container is used, as this has to contain the hot, often liquid food, it should have a high degree of rigidity. At present aluminium foil pressings are often used as individual food packs to permit the heating of the food while in the pack on the hotplate or in an oven and in some cases to render it possible to serve the food in these pressings. One of the disadvantages of these foil packs is that they are usually not rigid enough for food which is soft or liquid when hot. The cause of this shortcoming is that they must be good heat conductors and not too thick for reasons of cost and weight, and the provision of stiffening sections by pressing the foil has its limits.

A higher degree of stiffness of the individual food package whch has to contain the hot, often liquid, food is desirable particularly if the food is heated and served in it. The present invention provides for this and the greater rigidity of the tray packs according to the invention also facilitates their filling while they are on a conveyor line without the conveyor line itself needing any special construction. Since these containers are like shallow boxes with often thin top and bottom covers but fairly rigid side walls they can be held in any order on a conveyor belt merely by exerting a slight squeeze on them through side rails or by soft elastic bands running between the rows of containers. The heating film covers all walls or only top and bottom wall of the container. The part of the heating film which subsequently forms the top cover of the box is simply folded back over the front and/or back side walls, while the container is being filled. To prevent food drippings from soiling the other sides of the pack a guard strip is fixed above the line of these other side walls. The superiority of the tray packs according to the invention over present day foil packs is made possible because the present invention provides a hot film surface which is the heat creating element itself and which can be in close contact with the food. The container need therefore not be of good heat conductivity throughout its thickness. Thus it can be made from or incorporate laminated structural material of high stiffness but low weight. This material is generally sandwiched between two flat films or foils of which the inner film may be or may support the thin plastic heating film with the metallic pattern and the outer a decorated paper, plastic film or metallic foil. Between and to these thin, smooth skins a thick, airy, buckling resisting layer is stuck consisting for instance of corrugated paper or cardboard, stiff plastic foam, honeycomb construction, papier-maché or a similar, cheap and lightweight stiffening filler. There is no need to make the whole package from this laminated material. It is, for instance, sufficient to have it on the four low side walls of shallow box—or tray—like food packs, thus constituting a stiff frame of the stressed skin type, while the large bottom area or top and bottom areas are formed only by the heating film proper. Thus as shown for example in FIGURES 15 and 16, the sides of the container are made of corrugated paper 91 having the usual base paper 92 and another paper 93 stretched over and secured to the crests of the corrugations so that a composite material of the stressed skin type results which is stiff in planes normal to the corrugations as well as along the corrugations which are here set perpendicular to the top and bottom of the container. The heating film 94 forms the top and bottom, with tapes 95 carrying the terminal areas projecting sideways and this assembly containing the food 96 is contained in a usual cardboard box 97 recessed at the bottom to protect the film and contents. Such packs can be safely stacked on one another and can be connected in circuit when so stacked.

Containers of this character are particularly useful on aircraft on which an ample supply of direct current at a voltage of about 28 volts is often available. The packages may be supported in trays or tray insets having moulded compartments serving as armchair trays on which the meal is served. For defreezing and heating up quickly a large quantity of individual food packs supplied in bulk boxes or on stacks of trays or tray inserts the total contents of each bulk box or stack of trays is divided into two lots and the terminals of all food packs are connected in parallel within each lot. To keep the food only warm the collective terminals of two (or more) lots of food packs are connected in series. The heating films of the individual packages are designed for the aircraft's supply of 28 volts and have three terminal areas and two meander paths each so that they can individually be connected in series or parallel. The switching operations are controlled by conventional temperature sensitive devices or by timing. The described heating of the packs in their bulk boxes or trays and the series-parallel switching enables a steep heating curve to be obtained and the food to be kept warm without an oven or hot box. The speed of heating enables hot meals to be served from deep frozen packs even on short trips.

The same scheme of serving heated food on trays can be applied in such spaces as on motor cars and coaches and in trains and also in hospitals, canteens, camps, schools, factories and so forth. For all these purposes as well as for aircraft, the tray may be provided with means for connection to the low voltage electricity supply and preferably also with one or more small lamps for indicating that the heating is "on" or for throwing soft light on the tray. The latter is particularly desirable when eating in dark places (television watchers' trays, motorists' trays, night meals in sick room, camps etc.). The tray on which the food is served may in this case be a permanent washable tray.

The food itself as above described is shipped in or served on dispensible, preferably decorated tray insets which incorporate heating films and means of connection and are usually cheap pressings or mouldings in plastic or papier-maché. Such insets may be used to heat up food, keep it warm while eating, and replace plates. In order to keep them at a low cost of production they are made too flimsy to be used instead of an armchair tray, but when placed on a tray, or on a table or a board they stand at least the rigours of one meal.

At this stage it will be convenient to describe further the provision for the supply of current to the heating film. This is generally either from the secondary winding of a transformer completely insulated from the mains or from the battery of a car or other vehicle. In some cases it may be a stationary battery associated with a charging device. The voltage supplied is a low, harmless voltage not needing compliance with the electricity supply authorities' regulations. For aircraft packages it is usually 28 volts but for general use preferably it is the same as is standard in motor cars which is 12 volts in most cases. Where temperature control can be provided for either by an automatic cut out or by the attention of the user, provision for a very brief heat shock at a two to four times higher voltage can be made by a time switch. For the private consumer a small transformer of large surface area capable of sustaining a high short-time overload is sufficient for heating up his pre-cooked food packs, canisters or beverages, but for public eating places, vending machines or for the cooking facilities described later a larger transformer is required. In these installations the maximum voltage is supplied to the heating film first while the food pack is on a tray or held inside the vending machine. The temperature of the package is sensed either by surface thermometric elements in the tray or holding device or by the heating film itself. (This will be described later.) The sensing actuates further controls, such as reduction of the voltage to the value for merely keeping the food at the temperature reached or desired, rejection of packages for faults in heating film, switching on of a signal lamp for "ready, take out" or giving a warning. The installation may have several channels to heat several food packages simultaneously. Coin operated vending machines with only one channel can however have several terminals or hot plates where food packs are kept warm while slowly emptied by the consumer.

A transformer for use by the general public or in a restaurant is preferably designed to be like a flat box so that it can be used as warmplate and lends itself to artistic styling and use as a centre piece on a dining table. It is switched on the primary side and has lamps to show that it is "on." It may have a switch to reduce the 12 volts output to a "keep food warm" level.

The 12 volt terminals of the transformer may as shown in FIGURE 17 be in the form of leaf springs 72 with large contact areas to grip the foil terminals indicated at 73 of the heating film. These leaf springs 72 are not directly connected to the transformer winding but are supported by an insulator 74 say of plastic or rubber and are slidable conveniently against the action of a spring not shown. When the terminals 73 have been pushed between the leaf springs 72 continued further inward movement which may be transmitted directly from the food package or by hand through a rod 75 attached to the insulator 74 carries the leaf springs further inward when they ride off insulating guides 76 between metal terminals 77 which are connected to the transformer secondary so that the current is now switched on to the heating film. When the terminals are pulled out they first switch the current off by drawing the leaf springs on to the insulating guides 76 and thereafter the heating film terminals are pulled right out of the leaf springs.

For cars or other vehicles or camping places, similar terminals can be provided on a hinged tray which can be fixed to the dashboard or hung over the back of the front seat of a car of some similar support. It is a self-contained accessory with a fuse or cut out and cable for connection to the battery or to a socket on the dashboard. Alternatively terminals with connections to the battery may be built in.

In order not to complicate the description it has mostly been confined so far to heating films operating on a fixed voltage, say 12 volts, supplied from a transformer or battery, and to initial heat shocks or subsequent reductions in energy supply being provided for by suitable switching or other usual devices on the supply side. The present invention includes the automatic provision of an advantageous heating cycle particularly in conjunction with the small transformers of large surface area already referred to. A further object of this feature is the reduction of the cost of these transformers and their use as hot plates or the like. These transformers are constructed as in said U.S. patent application Serial No. 752,384 in such a way that both the iron and the windings have a very large surface exposed and also that both core and windings have a very small cross section. On "no load" the secondary voltage is much higher than the 12 volt nominal and arranged to be very near, but still below, the minimum to which local regulations apply and below the voltage which is safe to touch—whichever the lower in case the two figures are held to differ.

A consequence of the extraordinary saving in weight by the reduction of the cross section of the active materials is the fact that the transformer will get hot or hotter than the food package about as quickly as the heating film fed by it. Its output voltage will consequently fall considerably while the wattage available gets down as the square of the voltage. At the same time the ohmic resistance of the heating film rises as it heats up and thus further reduces the current intake. Consequently a heating cycle results which is much different from that available from a fairly constant voltage supply. An initial heat shock is supplied automatically and the heating-up is speeded considerably.

The "lost" energy goes mainly into heating the transformer and this is made use of in the hotplate arrangement already mentioned. The large surface area of the transformer as well as a thermostat and/or cut-out in the primary circuit of the transformer prevent its temperature from rising beyond predetermined limits. The cut-out will only permit the transformer to be switched on again after its temperature has dropped sufficiently which will be in a very short time in view of its large surface area. Transformers used in a kitchen or the like may have a tubular shape or feature trays, pockets or other cooling surfaces which may be filled with or immersed in water, if there is an unforeseen overloading due to a party for example.

The figure of 12 volts is preferred as the nominal voltage of the transformer secondary. The transformer may be operated at this voltage for a long time and at constant temperature when it is used not to heat up a single food pack, but just to keep hot a number of such packages or equivalent devices which have their heating films connected in series.

The provision of two terminals in the foil pattern of the heating film can be varied. Three terminals can provide for different heating rates or for different supplies, such as for the heating cycle described or for a fairly constant 12 volt supply. They will enable two parts of the foil pattern to be connected in parallel for heating-up and in series for keeping warm or quick thawing of deep-frozen food using a connector as shown in FIGURE 3 for example.

The terminals of the heating film are preferably only large bare areas within the foil pattern. They are usually folded over. The arrangement of the folds depends also on the preferred way of inserting them into the supply terminals. A fold turning the metal foil outside is preferred for a "push-in" type of supply terminal as is shown in FIGURE 17. However it is possible to arrange the terminals of the film so that they are folded with the metal foil inside, that is with the folded foil areas in contact with each other as shown in FIGURE 18. Here the metallic foil pattern 78 is on the inside of a paper container 79. There may be additional layers as previously described herein. The metal pattern includes terminals 81 which have their extreme ends folded up and secured to a paper strip 82 which continues below the terminals. By pulling out the terminal strip the terminals are carried up through the top of the bag 79 but still remain insulated by the paper strip. Connection can then be made to them for example by the device of FIGURE 2 or FIGURE 3. FIGURE 18 has other features which are described below.

The design of the heating film, nominally made for—say 12 volts—should take into consideration the heating cycle described. This is particularly necessary when a fuse is provided in the circuit, for instance in the foil pattern of the heating film itself. Such provision is made by narrowing the width of the continuous line at a convenient place in the film so that this part of the pattern constitutes a fuse which will blow at a certain current. Another way to provide a fuse is to connect a tiny link in the pattern which consists of two foil pieces under tension held together with a solder. The tension may be that which is present in any event in such an article as a filled bag of flexible heating film or by development of vapour pressure during heating of the foodstuff. If the solder is a low melting solder the fuse also breaks on being overheated by any means.

The use of low melting point solder as a fusible element is only one of a variety of means of guarding against undesirable temperature rise proposed by the invention. In the following examples alternative means to achieve a similar protection are given.

In the description of the three layer structure of the heating film consisting of unpatterned foil-plastic film-foil pattern, it was mentioned that this material enables other effects as well to be obtained. One such effect is to actuate a cut-out if a hot spot occurs or the overall temperature rises unduly. The plastic film separating the two metallic layers is not only thin but is of a substance chosen for its melting point at the critical temperature at which the cut out is to be actuated. The unpatterned foil is earthed. It is thick enough and of sufficiently high melting point to be unaffected by the "short" arising when the plastic film melts at any point. It is preferably an aluminum foil of about .002″ thickness. The earthing current is used to release a cut-out or blow a fuse anywhere in the circuit, but it is preferred to have a fusible element in the heating film itself by arranging for the earthing current to break the path of the current in the foil pattern. For that purpose a fusible element is provided in the foil circuit near a terminal, for instance the low melting solder type referred to previously or another temperature actuated "explosive means" of rupture of that circuit. A fine meander pattern between the earth terminal and the unpatterned foil is arranged opposite and as close as possible to this rupture element so that the earth current can actuate it in case of a short by heat conduction from the meander pattern.

The principle illustrated by the above example can be carried into effect in several other forms.

The low melting solder can be replaced by a conductive adhesive consisting for instance of graphite or metal powder in a binder softening at the critical temperature. The "explosive means" of rupture can be the use of steam rising from a heated capsule enclosing a few drops of water, it can be a small piece of steel magnetically operated by a spiral coil element instead of heat actuated.

The cut-out provides only one type of temperature and "safety" regulation. The temperature of the food packed can be sensed and the supply regulated accordingly by incorporating thermometric elements. They can be made a separate part or layer of the heating film or the resistance change of a standard foil pattern can be directly sensed by a device on the supply side. The accuracy obtainable with the aluminum pattern—while insufficient in standard measuring devices—is generally sufficient for the purpose here in view.

Here it might be emphasized that the use of aluminum foil is preferred, but the invention is not restricted to this metal. Tinfoil is another possible choice, and if other metals or alloys including for instance titanium becomes available as thin layers or foils at a price making their use economically feasible, they may also come into consideration, particularly for the higher temperature heating films.

The invention includes the application of the dispensable heating films to egg containers and cups.

The heating film for egg boiling may be vacuum formed into a shape enclosing the egg. It is crimped to accommodate variations in the size and shape of an egg or of the egg cup or egg crate to which it may be stuck. The crimping also facilitates the insertion of the egg and permits clamping of the foil terminals by spring contacts such as those of FIGURE 2 or 3 without pressing the egg. When a dispensible egg crate is used it may be of decorated papier mache or cardboard and styled as a single egg cup while the other half of the crate may be a coherent unit for a number of eggs as in present use. The permanent contacts may be on a flexible cable or tape and the connector may also incorporate an eggtimer, switch, fuse, etc. The heating film may also be stuck on to a standard type of egg crate.

In the above example the dispensible food package—that is the egg crate—has been used not only as an eating applicance but also as a cooking means. This principle varied in shape and styling, in heating energy and temperature can be applied to other foodstuffs as well and be used for cooking as well as for heating up or keeping the heated food warm. Among other advantages it dispenses with or reduces washing-up.

The egg boiling example has also illustrated that the present invention includes the use of the heating film for cooking. This is however not only a question of temperature and wattage required; heating film structures and supply sources for all temperatures and energies necessary for all practical cooking processes have already been described earlier. The following additional features of the invention deal with a number of varieties of foods and their cooking.

When the package contains liquid food or food held in a liquid the terminals of the heating film are made accessible only when a steam escape is open. This precaution is to be observed on most packages. Heating films in the form of immersion heaters or of bags inside a tin or box have their terminals secured to the wall of the tin or box which must be opened before connection can be made to them. Plastic film packs or the like may have a hole held closed or covered by the folded terminals or a strip connected with the terminals; when the terminals are pulled out or pushed in for switching the current on the hole is uncovered. Thus as shown in FIGURE 18 there is an aperture 83 in the bag 79 and pattern 78 which is normally covered by a seal 84 to which the paper strip 82 is attached. Breaking of the seal opens the aperture 83 and also releases the paper strip enabling the terminals to be pulled out. The lower end of the paper strip may be narrower than the upper part which is to insulate the terminals 81. Alternatively as in FIGURE 1 for example the terminals may be sealed in and breaking of the seal creates or uncovers an opening in the package.

When the contents of the package is a dry food or is a concentrate, which is dry or viscous, which has to be stored in this condition but mixed later with water or sauce or other liquid or to be boiled in such a liquid, the dry food or concentrate should not be heated as such by the film. The invention provides two schemes for such cases. Thus the requisite quantity of water or other liquid can be sealed in a plastic bag which is part of the heating film or attached to it, for instance by the film being wound round the bag. The seal of the bag gives way when a certain temperature is reached for instance boiling point, and the liquid pours on to the dry foodstuff or concentrate. Boiling can thus proceed. In the second scheme the dry material or concentrate is packed in a heating film which is very porous, for instance in a perforated bag, the pores or perforation of this package being sealed by an edible substance soluble in hot water, such as gelatine. If the foil pattern is sufficiently coherent to be easily removable from the hot food as a whole it may be used directly on a gelatine film without another (plastic) film support to enclose the liquid or powdered concentrate. Several such bags, each for an individual portion, may for instance be packed in a box or tin. For use each package is placed in a dish with the requisite amount of water and switched on. Mixing occurs as soon as the hot liquid has dissolved the gelatine film.

Using a fairly strong heating film this scheme may be employed to provide sausage type skins enclosing solid food in a concentrated sauce. Using sugar, chocolate or other similar materials as soluble substances to fill the pores or perforations of the heating film pack the method may be extended to beverages such as coffee or chocolate and to various hot sweets.

Yet a further possibility is application to the steaming of food. Thus by making the bag in which the food is stored liquid proof and enclosing a liquid in a can or foil container and providing a steam escape in it, the food can be steamed by the passage of steam through the food to a final steam escape from the package which is opened prior to or in switching on the current. Another arrangement for steaming is that shown in FIGURE 19. This is intended more particularly for the defreezing and then steaming of frozen raw food such as vegetables. The food 85 is enclosed in a bag 86 which incorporates the heating film and is held in a separate wrapper at least the bottom of which is porous as at 87. The heating film is designed so that it develops most heat at the bottom of the bag. The lower part of the bag has at least one concertina fold as at 88 and contains the necessary water or other liquid. This liquid can be in the form of an ice cube inserted during packing or liquid can be added by the user when he opens the upper end of the bag to gain access to the terminals 89. In the use the bag is suspended by the terminals 89 in a clip connector such as that shown in FIGURE 2 or 3. The bag at first remains folded until defreezing is completed and the liquid is heated up, but when the pressure rises the fold 88 unfolds and room is left at the top for steam. If need be, there can be several folds depending on the proportions, the rate of boiling and such like conditions. Only a small steam escape is provided and there will be a constant reflux of condensed steam back into the body of liquid being boiled. Instead of a bag, a box may be used but this must be large enough to provide the necessary steam space.

The arrangement above described for dealing with dry foods and for steaming and various other schemes are arranged so that necessary changes in the disposition of the parts or in the opening and vents are effected automatically before access to the terminals is obtained. Such provisions are preferable to means which require attention and/or extra tools, although the present invention covers them as well. Such tools are for instance pins to be inserted, stoppers to be removed, etc.

In frying or stewing packs there may be a partition separating the fat or sauce from the other food, and the heating film may be part of the partition or immersed in the liquid only. In case of frozen food the partition may be an edible film, but generally this is not the case. It is torn or perforated either simultaneously with the opening of the steam escape by the action of getting access to the terminals or later by the heat or vapour pressure of the heated liquid. This rupture may be used for automatically timing the process by designing the package so that the circuit in a part of the foil pattern is also ruptured and the energy input is reduced to a desired level.

For baking, roasting or grilling thin food slices a high temperature heating film may be used which is spaced from the foodstuff and from the insulated container wall by expanded metal spacers on both sides of the food slices. For lower temperature work the attachment would be carried out by sticking or other fixing operations.

The heating films and food packages themselves often form eating appliances, and this form of the food package is proposed for use in camping, for travelling, for the army and wherever provision for crockery and conventional tableware is inconvenient.

I claim:

1. A food package comprising a dispensable container having outer walls and with a foodstuff therein, a separate dispensable electrical heating film at least having the major part of its suface within the outer walls of the container and at least one electrically and thermally insulating layer between the film and the outer wall of the container, said heating film including terminal areas accessible without removing the foodstuff from the container, and said heating film also including an electrical conductive pattern of metal foil providing at least one meander path between said terminal areas and presenting a value of resistance between said terminal areas which when connected by said terminal areas to a low voltage source heat is developed at a rate adequate to heat the foodstuff in the container, said film being thin and of large heat transferring surface area and positioned in the container so that its surface temperature during the heating period does not reach a value which would damage the foodstuff.

2. A food package as set forth in claim 1, in which the heating film is spaced from the container wall and has the foodstuff on both sides so that both surfaces of the heating film dissipate heat to the foodstuff.

3. A food package as set forth in claim 1, in which the heating film before heating forms an impermeable wall isolating at least part of the foodstuff and it permanently loses its permeability as a result of one operation involved in heating and removal of the foodstuff.

4. A food package as set forth in claim 1, in which the heating film has small openings therein which are closed by solid edible materials which are cleared from said openings as a result of the heating of the foodstuff.

5. A food package as set forth in claim 1, in which the terminal areas inside the container are accessible by providing an opening in the container which constitutes a vent.

6. A food package as set forth in claim 1, in which the package is provided with a passageway with said heating film positioned at least partly in the passageway through which the foodstuff is removed from the package when heated.

7. A food package as set forth in claim 1, in which said heating film constitutes a plurality of substantially parallel layers within the container.

8. A food package as set forth in claim 1, in which said heating film constitutes a plurality of substantially parallel layers within the container, at least some of said layers being provided with tear-off zones and with terminal areas so that they can be connected to an electric supply after being separated at the tear-off zones.

9. A food package as set forth in claim 1, in which said heating film constitutes a plurality of substantially parallel layers within the container, and at least some of said layers are provided with respective terminal areas, and the package including corresponding contacts which are held pressed against said respective terminal areas.

10. A food package as set forth in claim 1, in which said heating film constitutes a plurality of substantially parallel layers within the container disposed so that at least some of the layers dissipate heat to the foodstuff at a different rate from the others.

11. A food package as set forth in claim 1, in which said terminal areas are folded over and extend over substantially the entire length of two opposite edges of the heating film.

12. A food package as set forth in claim 1, in which said terminal areas are folded to lie within the package, and in which means are provided attached to said terminal areas and accessible from outside the package whereby said terminal areas are pulled out when connection to an electric supply is to be made.

13. A food package as set forth in claim 1, in which said container also includes a permeable wall separating it into at least two compartments with the foodstuff contained in at least one of said compartments, and in which an edible medium is provided which becomes fluid when hot contained in the other of said compartments, the heating film being adapted to heat said medium so that the heated medium passes through said permeable wall and heats the foodstuff in its compartment.

14. A food package as set forth in claim 1, in which said container is flexible and hermetically sealed, the pressure within the container being sub-atmospheric so that the heating film is held in contact with the foodstuff by the atmospheric pressure acting on the container, and said terminal areas being accessible without breaking the hermetic seal.

References Cited in the file of this patent

UNITED STATES PATENTS

| | | |
|---|---|---|
| 2,235,209 | Fletcher | Mar. 18, 1941 |
| 2,307,231 | Neff | Jan. 5, 1943 |
| 2,474,390 | Aff | June 28, 1949 |
| 2,522,810 | Bailey | Sept. 19, 1950 |
| 2,573,972 | Holland | Nov. 6, 1951 |
| 2,578,314 | Meunch | Dec. 11, 1951 |
| 2,671,731 | Vogt | Mar. 9, 1954 |

(Other references on following page)

UNITED STATES PATENTS

| | | |
|---|---|---|
| 2,682,596 | Cox | June 29, 1954 |
| 2,688,582 | Phair et al. | Sept. 7, 1954 |
| 2,724,674 | Pritikin | Nov. 22, 1955 |
| 2,737,571 | Eisler | Mar. 6, 1956 |
| 2,747,977 | Eisler | May 29, 1956 |
| 2,768,086 | Bliley | Oct. 23, 1956 |
| 2,781,119 | Talbot et al. | Feb. 12, 1957 |
| 2,834,686 | Reuman | May 13, 1958 |
| 2,844,695 | McLean | July 22, 1958 |